(12) United States Patent
Neighbors et al.

(10) Patent No.: US 10,525,870 B2
(45) Date of Patent: Jan. 7, 2020

(54) VEHICLE TAILGATE HAVING EXTENSION ASSEMBLY

(71) Applicants: Kyle Neighbors, Milford, MI (US);
Jereme A Berube, Sterling Heights, MI (US)

(72) Inventors: Kyle Neighbors, Milford, MI (US);
Jereme A Berube, Sterling Heights, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 15/901,465

(22) Filed: Feb. 21, 2018

(65) Prior Publication Data
US 2019/0255987 A1    Aug. 22, 2019

(51) Int. Cl.
*B60P 7/15*       (2006.01)
*B62D 33/027*   (2006.01)
*B60P 3/40*       (2006.01)

(52) U.S. Cl.
CPC .................. *B60P 7/15* (2013.01); *B60P 3/40* (2013.01); *B62D 33/0273* (2013.01)

(58) Field of Classification Search
CPC ....... B60J 1/04; B60J 1/06; B60J 1/025; B60J 3/002; B60J 7/1621
USPC ................ 296/96.2, 78.1, 92, 90, 96, 96.11; 424/426, 400, 464, 9.1, 9.2, 75, 473; 89/36.01, 36.07, 36.08, 36.09
See application file for complete search history.

(56) References Cited

U.S. PATENT DOCUMENTS

| | | | |
|---|---|---|---|
| 6,364,392 B1 | 4/2002 | Meinke | |
| 6,698,810 B1 | 3/2004 | Lane | |
| 6,923,488 B2 | 8/2005 | Bruford et al. | |
| 6,932,404 B2 | 8/2005 | Vejnar | |
| 7,234,749 B1 * | 6/2007 | Firzlaff | B62D 33/0273 296/26.08 |
| 7,530,619 B1 | 5/2009 | Brufard et al. | |
| 7,533,921 B2 * | 5/2009 | Ferrell | B60P 3/40 296/3 |
| 7,976,089 B2 | 7/2011 | Jones | |
| 8,087,709 B2 * | 1/2012 | Jackson, Sr. | B62D 33/08 296/26.08 |
| 8,608,219 B1 * | 12/2013 | Platto | B60R 9/06 296/26.05 |
| 10,005,396 B2 * | 6/2018 | Spahn | B62D 33/03 |

* cited by examiner

*Primary Examiner* — D Glenn Dayoan
*Assistant Examiner* — Sunsurraye Westbrook
(74) *Attorney, Agent, or Firm* — Ralph E Smith (57) ABSTRACT

The vehicle includes a cab, a plurality of side walls, a tailgate and an extension assembly. The plurality of side walls extend from an aft end of the cab. The tailgate is coupled to the side walls and pivotable about a horizontal axis between a closed position and an open position. The tailgate includes a plurality of panels that cooperate to define a cavity. The extension assembly includes a support member and an arm. The support member is disposed within the cavity and coupled to the tailgate. The arm has a longitudinal axis and extends through the support member and the tailgate. The arm is slidable along the longitudinal axis between a stowed state and a deployed state when the tailgate is in the open position and the closed position. The arm is also permitted to rotate about the longitudinal axis when in the unlocked position.

10 Claims, 9 Drawing Sheets

Fig-8

VEHICLE TAILGATE HAVING EXTENSION ASSEMBLY

FIELD

The present disclosure relates to a vehicle tailgate having an extension assembly.

BACKGROUND

This section provides background information relates to the present disclosure and is not necessarily prior art.

Some vehicles, for example pick-up trucks, include cargo beds that allow for storing and hauling of cargo construction materials (e.g., plywood sheets, wood boards, beams, etc.). Some of such vehicle cargo beds are inadequate to store and haul cargo that is longer than the length of the cargo bed. The present disclosure provides a vehicle having an extension assembly that allows for more secure storage and hauling of cargo that is longer than the length of the cargo bed.

SUMMARY

This section provides a general summary of the disclosure, and is not a comprehensive disclosure of its full scope or all its features.

In one form, a vehicle includes a cab, a plurality of side walls, a tailgate and an extension assembly. The plurality of side walls extend from an aft end of the cab. The tailgate is coupled to the plurality of side walls and is pivotable about a horizontal axis between a closed position in which the tailgate and the plurality of side walls define an enclosed cargo compartment and an open position in which the tailgate and the plurality of side walls define an opening to the cargo compartment. The tailgate includes a plurality of panels that cooperate to define a cavity. The extension assembly includes a support member and an arm. The support member is disposed within the cavity and is coupled to the tailgate. The arm has a longitudinal axis and extends through the support member and the tailgate. The arm is slidable along the longitudinal axis between a stowed state and a deployed state when the tailgate is in the closed position and slidable along the longitudinal axis between the stowed state and the deployed state when the tailgate is in the open position. The arm is also movable between a locked position in which the arm is prevented from rotating about the longitudinal axis and an unlocked position in which the arm is permitted to rotate about the longitudinal axis.

In some configurations, the arm includes a telescoping post and an engagement member extending from an end of the telescoping post. The engagement member extends into the cargo compartment when the arm is rotated ninety degrees from the locked position and the tailgate is in the closed position to define a plurality of columns of the cargo compartment.

In some configurations, the arm includes a stop member that is received in a depression formed in the tailgate when the arm is in the locked position.

In some configurations, the extension assembly includes a locking mechanism that is operable between a locked state in which the arm is prevented from sliding along and rotating about the longitudinal axis and an unlocked state in which the arm is permitted to slide along and rotate about the longitudinal axis.

In some configurations, the arm is coupled to the tailgate via a spring member. The spring member biases the arm toward the stowed position.

In some configurations, the arm is also coupled to the tailgate via another spring member. The another spring member rotationally biases the arm toward the locked position.

In some configurations, the longitudinal axis is perpendicular to the horizontal axis that the tailgate pivots about.

In some configurations, another extension assembly includes another support member and another arm. The another support member is disposed within the cavity and coupled to the tailgate.

In some configurations, the another arm is slidable along another longitudinal axis between a stowed state and a deployed state when the tailgate is in the closed position and open position. The another arm is also movable between a locked position in which the another arm is prevented from rotating about the another longitudinal axis and an unlocked position in which the another arm is permitted to rotate about the another longitudinal axis.

In some configurations, the arm and the another arm are slidable along and rotatable about a respective longitudinal axis independently of each other.

Further areas of applicability of the teachings of the present disclosure will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not of all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
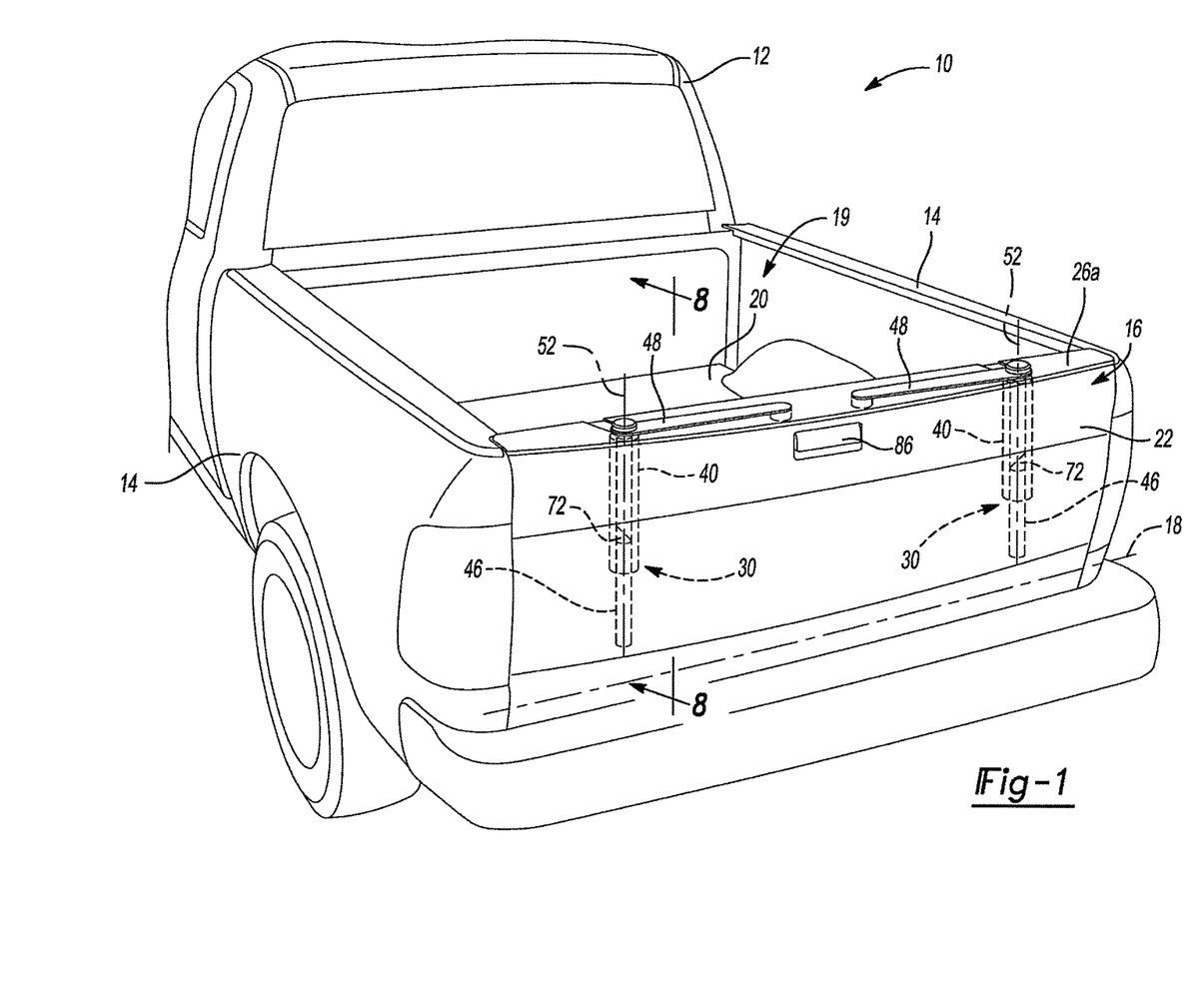
FIG. 1 is a partial perspective view of a vehicle having a plurality of extension assemblies and a tailgate according to the principles of the present disclosure.
Figure 2:
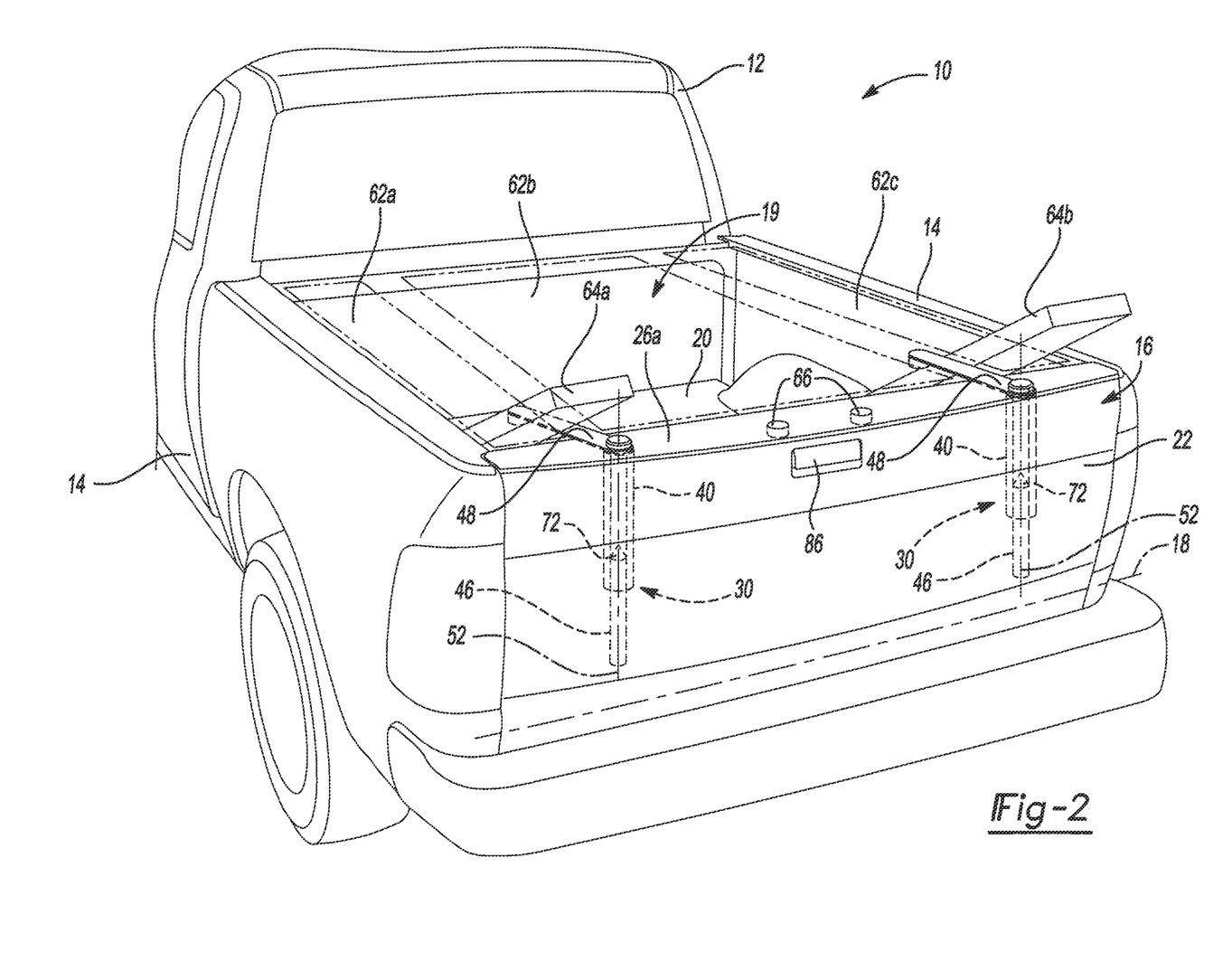
FIG. 2 is a partial perspective view of the vehicle of FIG. 1 with the tailgate in a closed position and the extension assemblies in a stowed state and rotated ninety degrees from a locked position.
Figure 3:
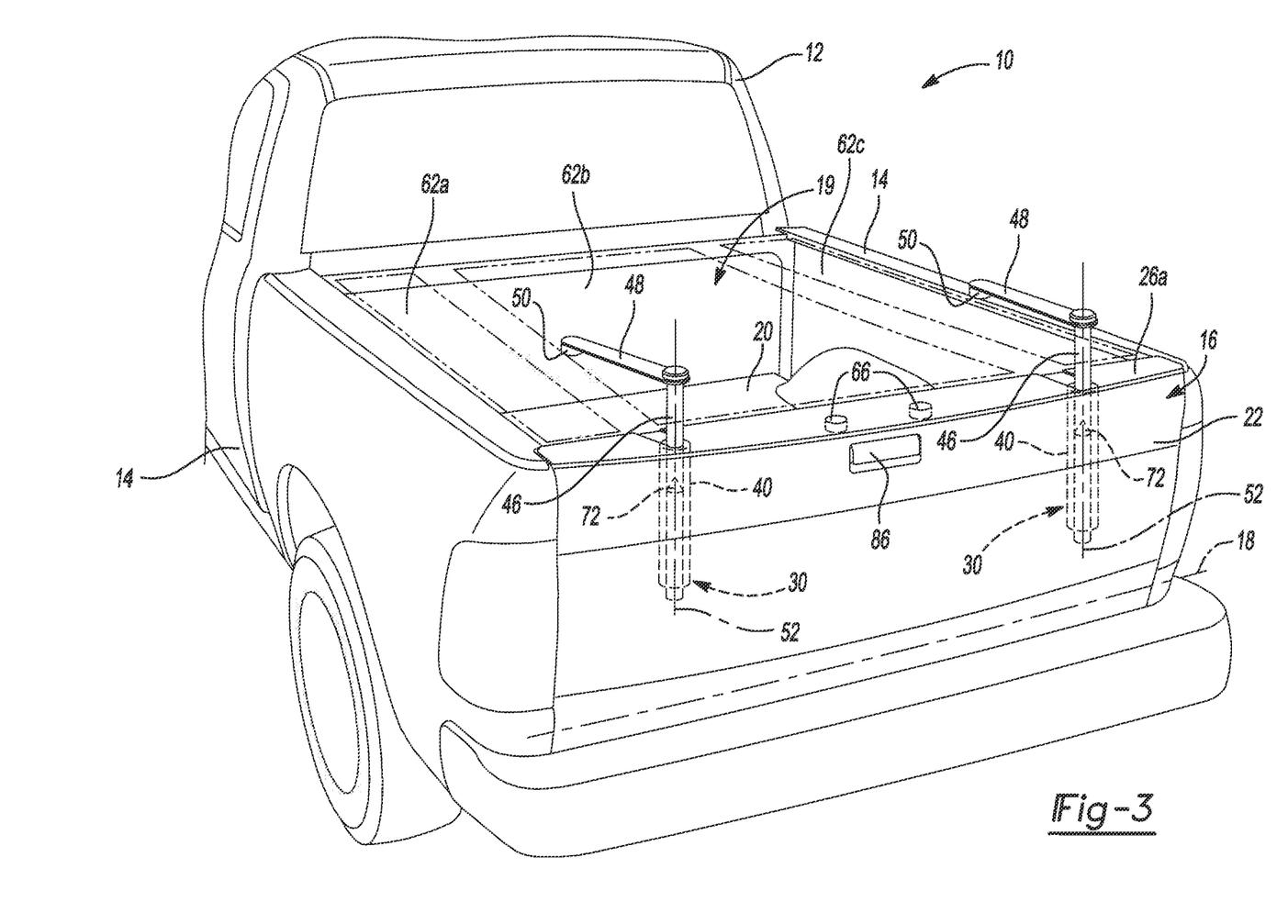
FIG. 3 is a partial perspective view of the vehicle of FIG. 1 with the tailgate in the closed position and the extension assemblies in a deployed state and rotated ninety degrees from the locked position.
Figure 4:
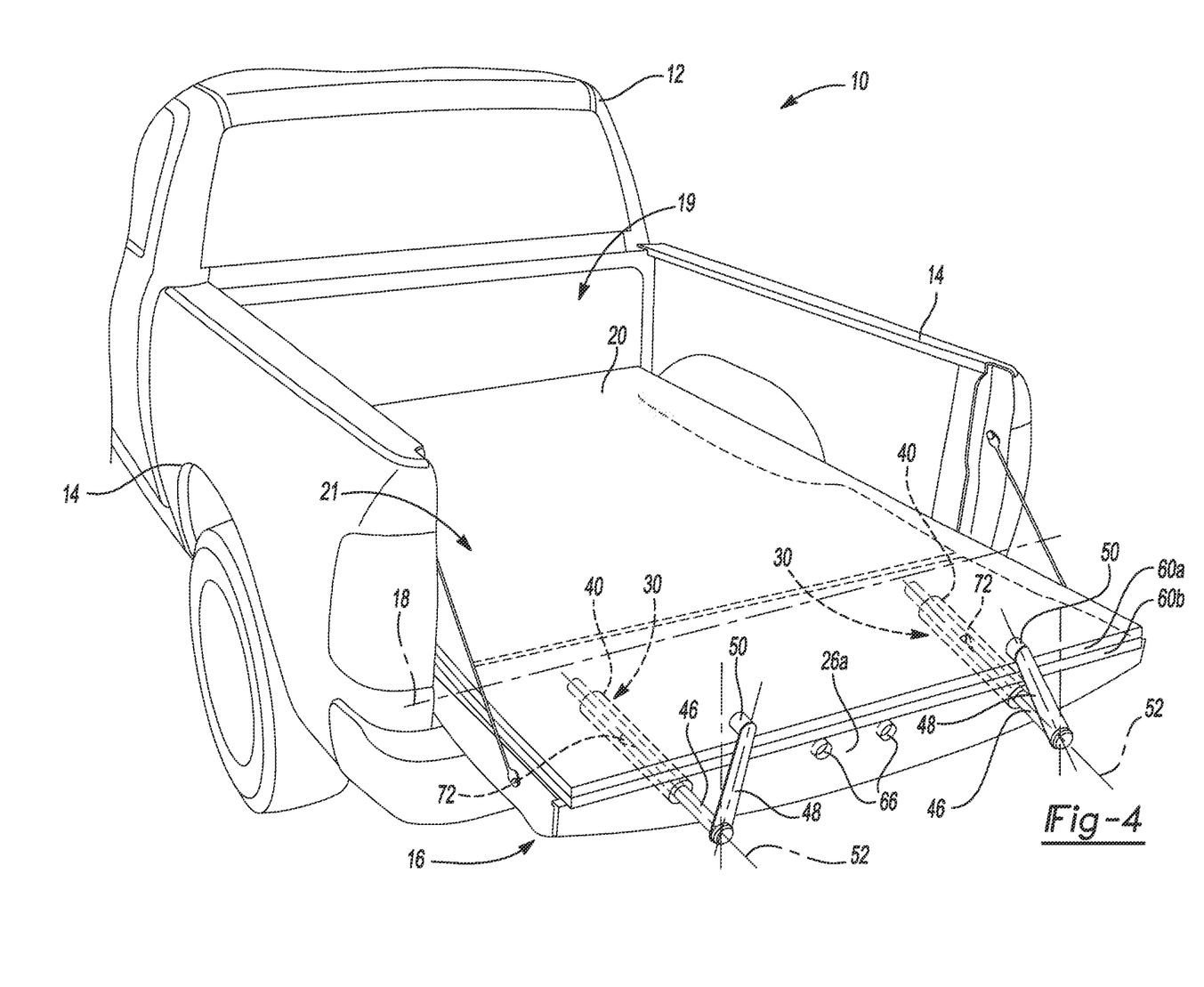
FIG. 4 is a partial perspective view of the vehicle of FIG. 1 with the tailgate in an open position and the extension assemblies in the deployed state.
Figure 5:
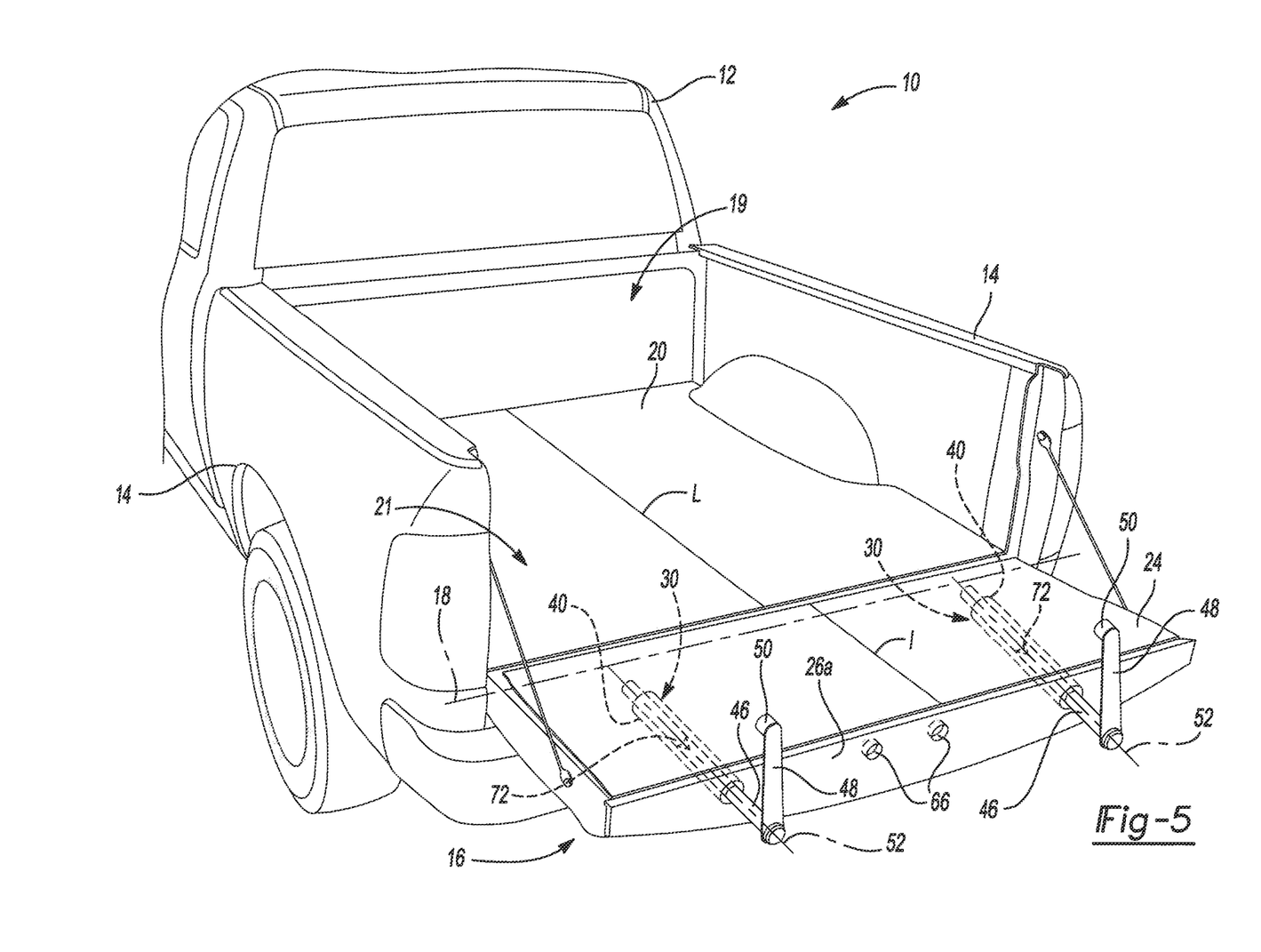
FIG. 5 is a partial perspective view of the vehicle of FIG. 1 with the tailgate in the open position and the extension assemblies in the deployed state and rotated ninety degrees from the locked position.

With reference to FIGS. 1-5, a vehicle 10 (e.g., a pick-up truck) is provided. The vehicle 10 includes a cab 12, a plurality of side walls 14, and a tailgate 16. The plurality of side walls 14 extend from an aft end of the cab 12. The tailgate 16 is coupled to the side walls 14 and pivotable about a horizontal axis 18 between a closed position (FIGS. 1-3) and an open position (FIGS. 4 and 5). When the tailgate 16 is in the closed position, the tailgate 16 cooperates with the side walls 14 to define a partially enclosed cargo compartment 19 having a bottom surface 20. When the tailgate 16 is in the open position, the side walls 14 define an opening 21 to the cargo compartment 19.

As shown in FIGS. 1-5 and FIGS. 7-9, the tailgate 16 includes a front panel 22 (FIGS. 1-3), a rear panel 24 (FIGS. 5 and 7) and side panels 26a, 26b, 26c, 26d (FIG. 7) that cooperate to define a cavity 28 (FIGS. 7-9) of the tailgate 16. A plurality of extension assemblies 30 are mounted within the cavity 28 of the tailgate 16. As will be described in more detail below, the plurality of extension assemblies 30 are independently slidable and rotatable relative to the tailgate 16 when the tailgate 16 is in the closed position and the open position.

As shown in FIGS. 6-9, each extension assembly 30 includes a support member 32, an L-shaped arm 34, and a locking mechanism 36. The support member 32 is disposed within the cavity 28 of the tailgate 16 and includes a bracket plate 38 and an outer tube 40. The bracket plate 38 is attached to an end of the outer tube 40 and includes an aperture 42a aligned with the outer tube 40 and disposed between a pair of apertures 42b. A fastener 44a (e.g., a bolt) extends through a respective aperture (not shown) of the side panel 26a of the tailgate 16 and a respective aperture 42b of the bracket plate 38 and is secured with a nut 44b, thereby coupling the support member 32 to the tailgate 16. The outer tube 40 extends from the bracket plate 38 toward the side panel 26b of the tailgate 16.

Figure 7:
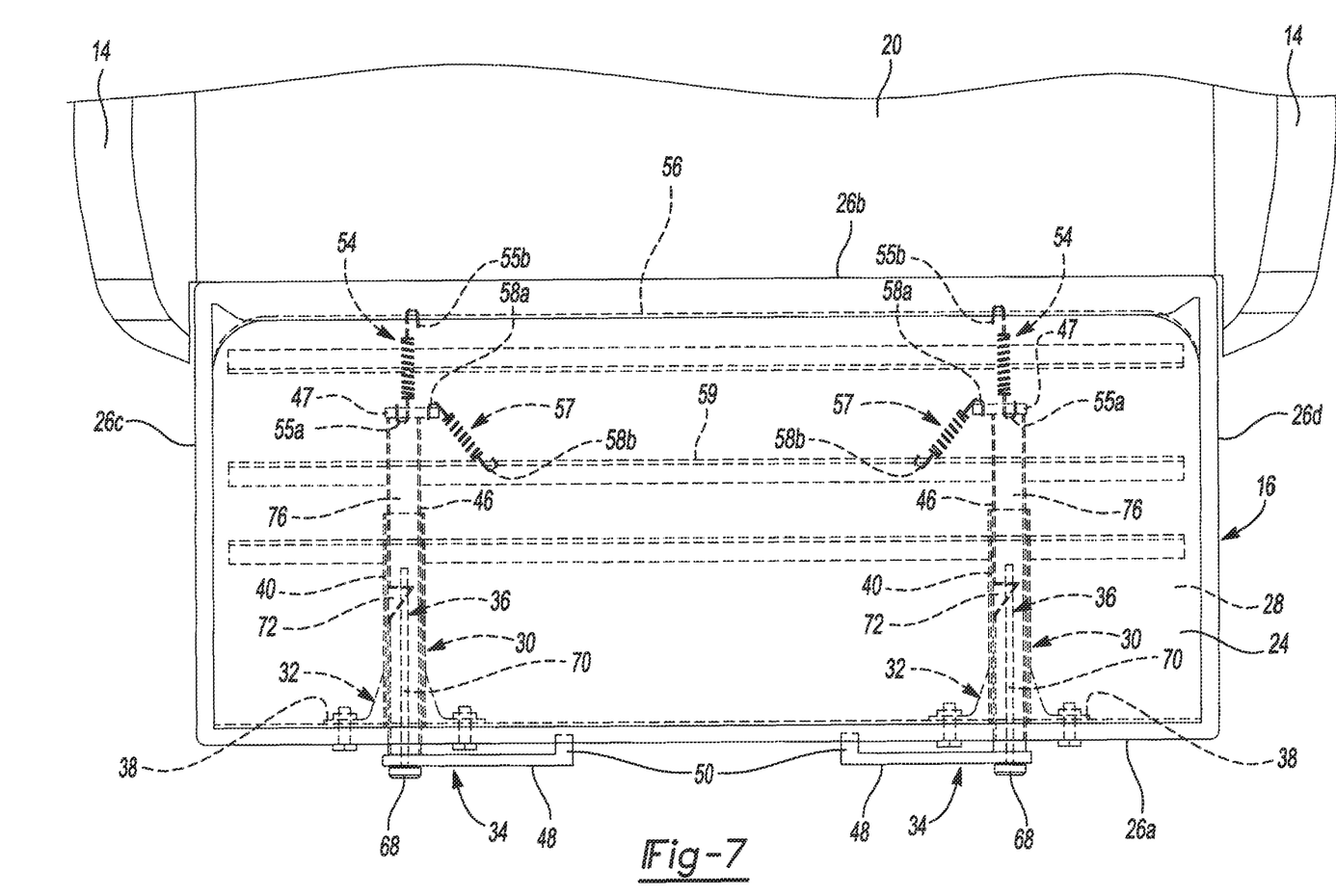
FIG. 7 is a top view of the tailgate while in the open position and the extension assemblies in the stowed state and the locked position.

The arm 34 extends through the support member 32 (i.e., the outer tube 40 and the aperture 42a of the bracket plate 38) and the side panel 26a of the tailgate 16. The arm 34 is slidable relative to the support member 32 and the tailgate 16 between a stowed state and a deployed state when the tailgate 16 is in the closed position (FIGS. 1-3) and between the stowed state and a deployed state when the tailgate 16 is in the open position (FIGS. 4, 5 and 7). The arm 34 is also movable between a locked position (FIGS. 1 and 7-9) and an unlocked position (FIGS. 2-5) such that the arm 34 is prevented from rotating relative to the support member 32 and the tailgate 16 when in the locked position and permitted to rotate relative to the support member 32 and the tailgate 16 when in the unlocked position. The arm 34 includes a telescoping post 46, a flange 47, an engagement member 48 and a stop member 50.

The telescoping post 46 is tubular-shaped and extends through the opening (not shown) of the side panel 26a of the tailgate 16 and the support member 32 (i.e., the outer tube 40 and the aperture 42a of the bracket plate 38). The telescoping post 46 defines a cut-out 51 (FIG. 6) that receives the locking mechanism 36 therein. The telescoping post 46 also has a longitudinal axis 52 that is perpendicular to the horizontal axis 18 that the tailgate 16 pivots about. The arm 34 is slidable along the longitudinal axis 52 between the stowed state (FIGS. 1, 2 and 7-9) and the deployed state (FIG. 3-5) when the tailgate 16 is in the closed position and the open position. The arm 34 is also rotatable about the longitudinal axis 52 once the arm 34 is moved from the locked position to the unlocked position.

Figure 6:
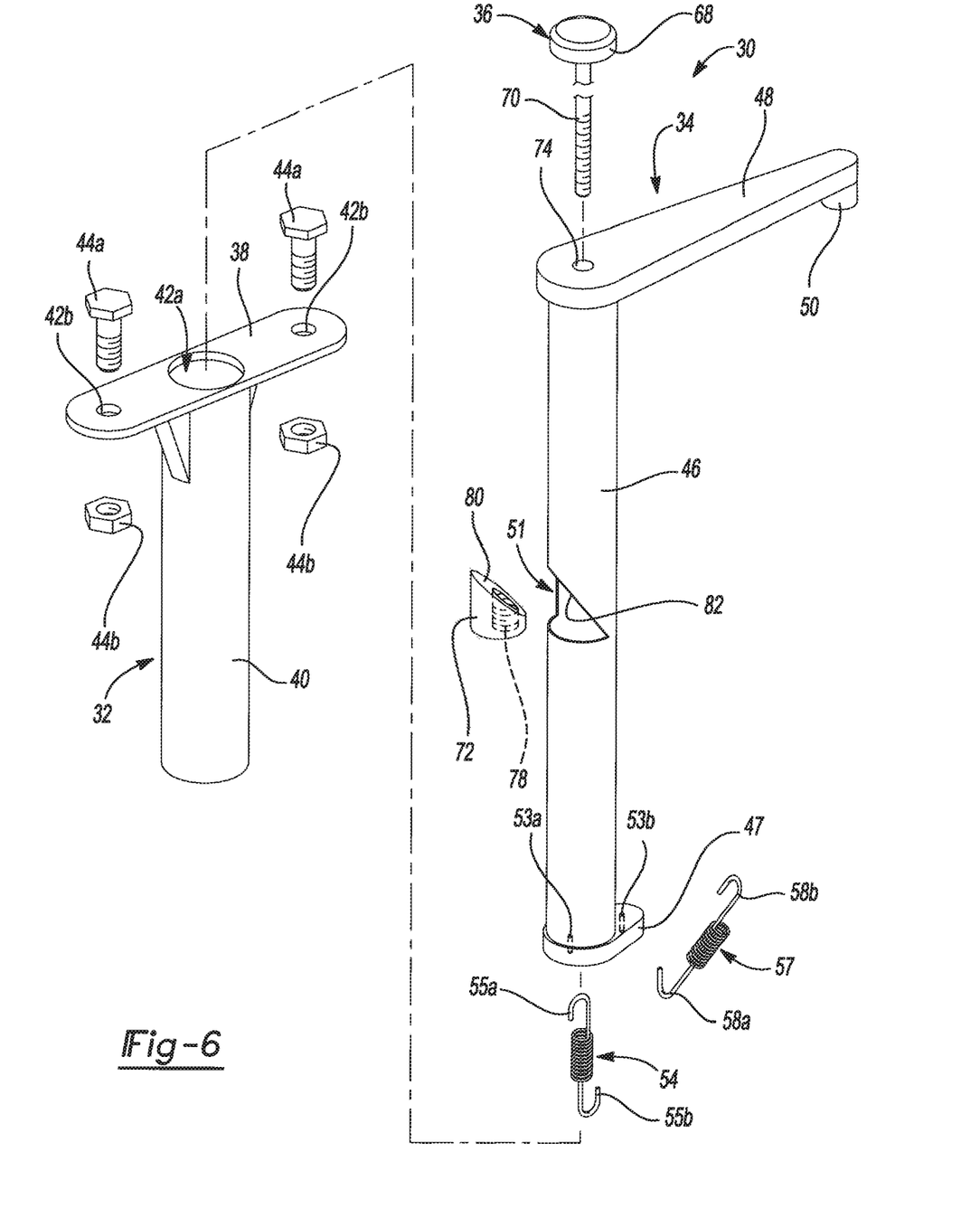
FIG. 6 is an exploded view of one of the extension assemblies.
Figure 8:
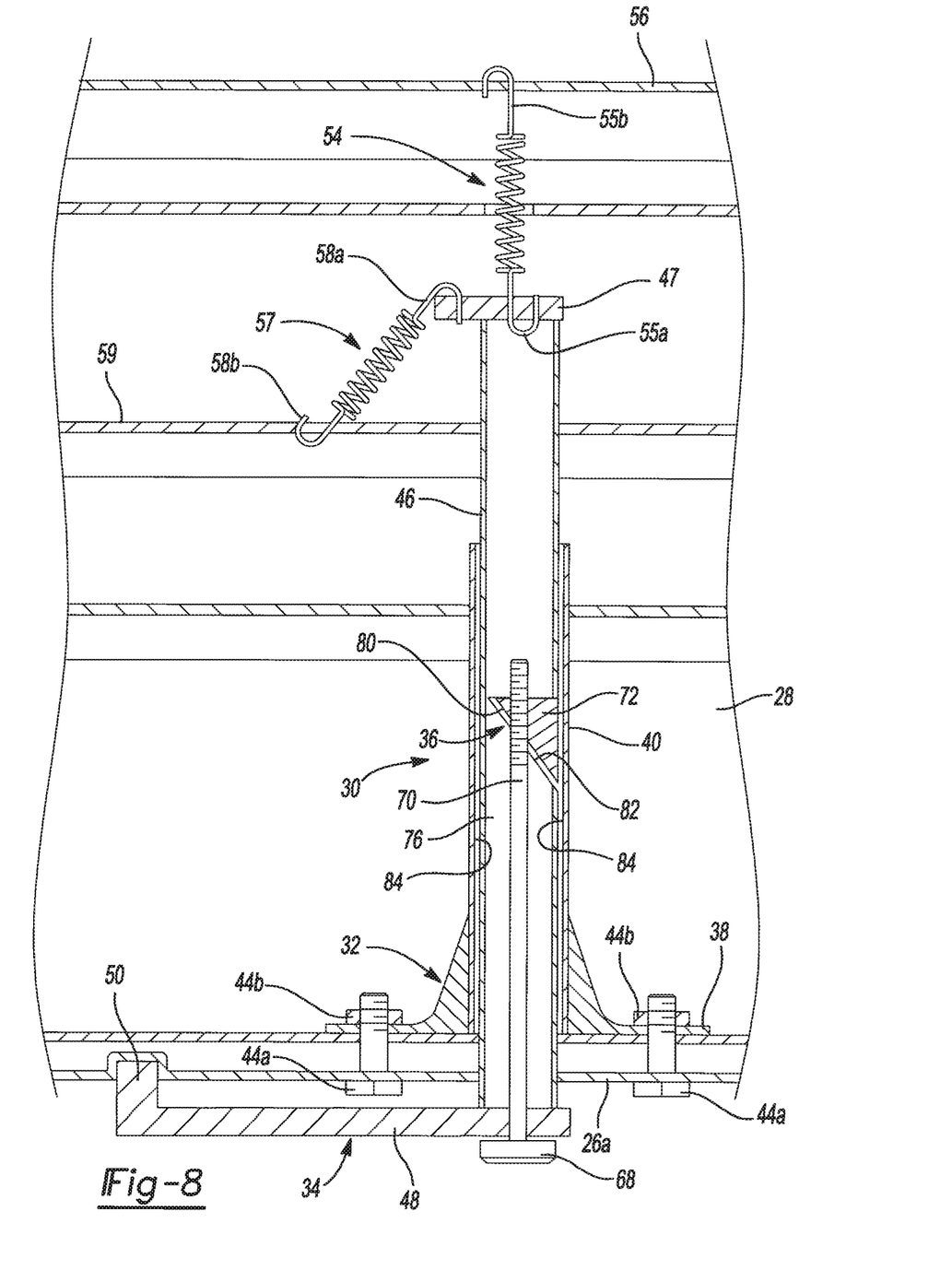
FIG. 8 is a cross-sectional view of one of the extension assemblies taken along line 8-8 of FIG. 1.
Figure 9:
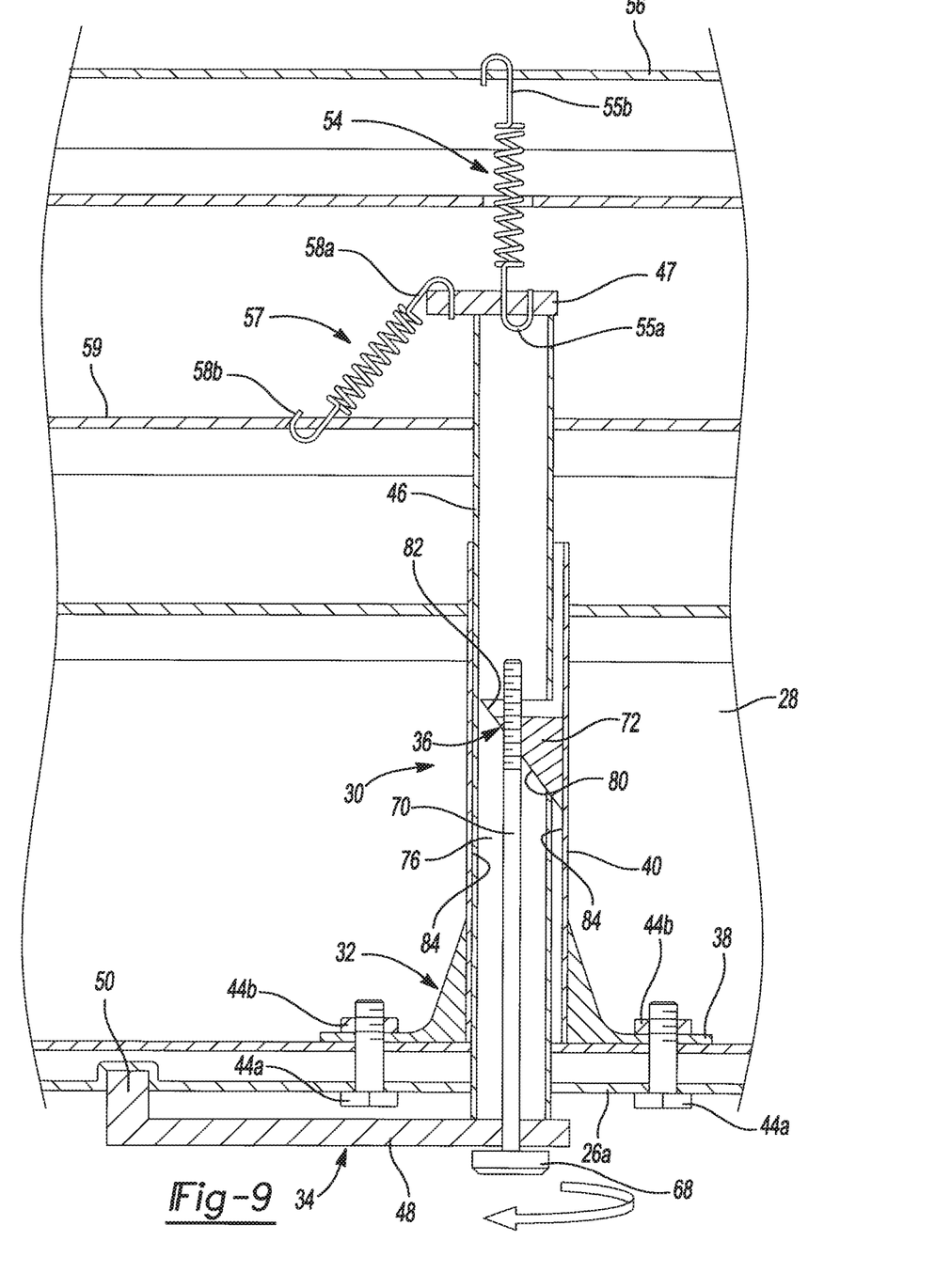
FIG. 9 is a cross-sectional view of the extension assembly of FIG. 8 in a locked state.

As shown in FIG. 6, the flange 47 is attached to one end of the telescoping post 46 and defines slots 53a, 53b therein. As shown in FIGS. 7-9, a spring 54 having hooks 55a, 55b couples the arm 34 to the tailgate 16 and biases the arm 34 toward the stowed state. That is, the hook 55a of the spring 54 is hooked in the slot 53a of the flange 47 and the hook 55b of the spring 54 is hooked onto one horizontal support 56 of the tailgate 16, thereby coupling the arm 34 to the tailgate 16 and biasing the arm 34 toward the stowed state. A spring 57 having hooks 58a, 58b further couples the arm 34 to the tailgate 16 and rotationally biases the arm 34 toward the locked position. That is, the hook 58a of the spring 57 is hooked in the slot 53b of the flange 47 and the hook 58b of the spring 57 is hooked onto another horizontal support 59 of the tailgate 16, thereby further coupling the arm 34 to the tailgate 16 and rotationally biasing the arm 34 toward the locked state.

The engagement member 48 is attached at one end to the telescoping post 46 so as to extend perpendicularly therefrom. As shown in FIG. 4, the engagement member 48 is configured to contact cargo 60a, 60b (e.g., plywood or drywall sheets, etc) extending out of the opening 21 of the cargo compartment 19 when the tailgate 16 is in the open position and the arm 34 is in the deployed state such that the cargo 60a, 60b is secured relative to the bottom surface 20 of the cargo compartment 19 and the tailgate 16. As shown in FIGS. 2 and 3, the engagement member 48 also extends into the cargo compartment 19 when the arm 34 is rotated ninety degrees from the locked position, for example, and the tailgate 16 is in the closed position to define a plurality of columns 62a, 62b, 62c of the cargo compartment 19. In this way, a user (not shown) can separate cargo 64a, 64b (e.g., wood boards or beams) contained in the cargo compartment 19. For example, one piece of the cargo 64a can be of a different material than another piece of cargo 64b, and therefore, the user can dispose the piece of cargo 64a in the column 62a and the another piece of cargo 64b in the column 62c to separate the cargo 64a, 64b from each other in the cargo compartment 19 (FIG. 2).

The stop member 50 is made of a polymeric material, for example, and is attached to another end of the engagement member 48 via a fastener (not shown). As shown in FIGS. 1 and 7-9, the stop member 50 is received in a depression 66 formed in the side panel 26a of the tailgate 16 when the arm 34 is in the locked position to prevent the arm 34 from rotating about the longitudinal axis 52 of the telescoping post 46. As shown in FIG. 4, the stop member 50 is configured to contact the piece of cargo 60a extending out of the opening 21 of the cargo compartment 19 when the arm 34 is in the deployed state and the tailgate 16 is in the open position to further secure the cargo 60a, 60b relative to the bottom surface 20 of the cargo compartment 19 and the tailgate 16.

The locking mechanism 36 is operable between a locked state in which the arm 34 is prevented from sliding and rotating about the longitudinal axis 52 of the telescoping post 46 and an unlocked state in which the arm 34 is allowed to slide and rotate about the longitudinal axis 52 of the telescoping post 46. As shown in FIGS. 6-9, the locking mechanism 36 includes a handle 68, a rod 70 and a wedge 72. The handle 68 is threadably attached to an end of the rod 70. The rod 70 extends through an opening 74 of the engagement member 48 and into a cavity 76 of the telescoping post 46. The wedge 72 is disposed in the cut-out 51 of the telescoping post 46 and includes a threaded aperture 78 that receives a threaded portion of the rod 70. As shown in FIG. 8, the locking mechanism 36 is operable in the unlocked state (i.e., the arm 34 is prevent from sliding along and rotating about the longitudinal axis 52) such that the user rotates the handle 68, which in turn, rotates the rod 70 so that the an angled surface 80 of the wedge 72 is spaced apart from an angled surface 82 of the telescoping post 46 and the wedge 72 and the telescoping post 46 are spaced apart from an inner wall 84 of the outer tube 40. As shown in FIG. 9, the locking mechanism 36 is operable in the locked state (i.e., the arm 24 is permitted to slide along and rotate about the longitudinal axis 52), such that the user rotates the handle 68, which in turn, rotates the rod 70 so that the angled surface 80 of the wedge 72 abuts against the angled surface 82 of the telescoping post 46 and the wedge 72 and the telescoping post 46 abut against the inner wall 84 of the outer tube 40.

With continued reference to FIGS. 1-9, operation of the extension assemblies 30 will be described in detail. In some configurations, a user may need to haul the cargo 64a, 64b (e.g., wood boards or beams) from one location to another location using the cargo compartment 19 of the vehicle 10. The cargo 64a, 64b can be of a different material, for example, and therefore, the user may want to keep the cargo 64a, 64b separated from each other in the cargo compartment 19. As shown in FIG. 2, while the tailgate 16 is in the closed position and the locking mechanism 36 is in the unlocked state, the arm 34 is moved to the unlocked position (i.e., the stop member 50 is removed from the depression 66) and the arm 34 is rotated about a respective longitudinal axis 52 to a desired position (e.g., ninety degrees). Once the arm 34 is rotated to the desired position, the user rotates the handle 68 so that the locking mechanism 36 is in the locked state and the arm 34 is prevented from sliding along and rotating about the respective longitudinal axis 52. The engagement member 48 extends into the cargo compartment 19 to define the plurality of columns 62a, 62b, 62c. In this way, the one piece of cargo 64a can be disposed in the column 62a and the another piece of cargo 64b can be disposed in the column 62c, thereby keeping the cargo 64a, 64b separated from each other during transit of the vehicle 10.

As shown in FIG. 3, while the tailgate 16 is in the closed position and the locking mechanism 36 is in the unlocked state, the user deploys the arm 34 to a desired position and rotates the arm 34 to a desired position (e.g., ninety degrees). Once the arm 34 is deployed to the desired position and rotated to the desired position, the user rotates the handle 68 so that the locking mechanism 36 is in the locked state and the arm 34 is prevented from sliding along and rotating about the respective longitudinal axis 52. The engagement member 48 extends into the cargo compartment 19 to define the plurality of columns 62a, 62b, 62c.

In some configurations, the user may need to haul the cargo 60a, 60b (e.g., plywood or drywall sheets) from one location to another location using the cargo compartment 19 of the vehicle 10. As shown in FIG. 4, the cargo 60a, 60b can be longer than a length L of the cargo compartment 19, and therefore, the user actuates a handle 86 of the tailgate 16 so that the tailgate 16 pivots about the horizontal axis 18 from the closed position to the open position. In the event that the cargo 60a, 60b is longer than the length L of the cargo compartment 19 and a length l of the tailgate 16, the user, while the locking mechanism 36 is in the unlocked state, deploys the arm 34 along the respective longitudinal axis 52 to a desired position (i.e., to a position that causes the engagement member 48 to contact an end of the cargo 60a, 60b). Once the arm 34 is deployed to the desired position, the cargo 60a, 60b is disposed on the bottom surface 20 of the cargo compartment 19 and the tailgate 16, and the arm 34 is rotationally biased (via a respective spring 57) toward the locked position. In this way, the stop member 50 contacts the one piece of cargo 60a to further secure the cargo 60a, 60b relative to the bottom surface 20 of the cargo compartment 19 and the tailgate 16.

As shown in FIG. 5, while the tailgate 16 is in the open position and the locking mechanism 36 is in the unlocked state, the user deploys the arms 34 of each extension assembly 30 to a desired position and rotates the arm 34 to a desired position (e.g., ninety degrees). Once the arm 34 is deployed to the desired position and rotated to the desired position, the user rotates the handle 68 so that the locking mechanism 36 is in the locked state and the arm 34 is prevented from sliding along and rotating about the respective longitudinal axis 52.

It should be understood that one extension assembly 30 may be in operation at any given time instead of both extension assemblies 30 (i.e., the arm 34 of one extension assembly 30 is slidable along and rotatable about the respective longitudinal axis 52 to secure cargo in the cargo compartment 19 while the arm 34 of the other extension assembly 30 remains in the locked position).

What is claimed is:

1. A vehicle comprising:
a cab;
a plurality of side walls extending from an aft end of the cab;
a tailgate coupled to the plurality of side walls and pivotable about a horizontal axis between a closed position in which the tailgate and the plurality of side walls define a cargo compartment that is enclosed and an open position in which the tailgate and the plurality of side walls define an opening to the cargo compartment, the tailgate including a plurality of panels that cooperate to define a cavity;
an extension assembly including a support member and an arm, the support member disposed within the cavity and coupled to the tailgate, the arm having a longitudinal axis and extending through the support member and the tailgate, the arm slidable along the longitudinal axis between a stowed state and a deployed state when the tailgate is in the closed position and slidable along the longitudinal axis between the stowed state and the deployed state when the tailgate is in the open position, the arm also movable between a locked position in which the arm is prevented from rotating about the longitudinal axis and an unlocked position in which the arm is permitted to rotate about the longitudinal axis.

2. The vehicle of claim 1, wherein the arm includes a telescoping post and an engagement member extending from an end of the telescoping post, and wherein the engagement member extends into the cargo compartment when the arm is rotated ninety degrees from the locked position and the tailgate is in the closed position to define a plurality of columns of the cargo compartment.

3. The vehicle of claim 1, wherein the arm includes a stop member that is received in a depression formed in the tailgate when the arm in the locked position.

4. The vehicle of claim 1, wherein the extension assembly includes a locking mechanism that is operable between a locked state in which the arm is prevented from sliding along and rotating about the longitudinal axis and an unlocked state in which the arm is permitted to slide along and rotate about the longitudinal axis.

5. The vehicle of claim 1, wherein the arm is coupled to the tailgate via a spring member, and wherein the spring member biases the arm toward the stowed state.

6. The vehicle of claim 5, wherein the arm is also coupled to the tailgate via another spring member, and wherein the another spring member rotationally biases the arm toward the locked position.

7. The vehicle of claim 1, wherein the longitudinal axis is perpendicular to the horizontal axis that the tailgate pivots about.

8. The vehicle of claim 1, further comprising another extension assembly including another support member and another arm, and wherein the another support member is disposed within the cavity and coupled to the tailgate.

9. The vehicle of claim 8, wherein the another arm is slidable along another longitudinal axis between a stowed state and a deployed state when the tailgate is in the closed position and the open position, and wherein the another arm is also movable between a locked position in which the another arm is prevented from rotating about the another longitudinal axis and an unlocked position in which the another arm is permitted to rotate about the another longitudinal axis.

10. The vehicle of claim 9, wherein the arm and the another arm are slidable along and rotatable about a respective longitudinal axis independently of each other.

* * * * *